United States Patent
Laible

[15] 3,640,020
[45] Feb. 8, 1972

[54] PLANT POTTING MACHINE
[72] Inventor: Franz Laible, 7761 Guettingen Kr., Konstanz/Bodensee, Germany
[22] Filed: July 30, 1970

[30] Foreign Application Priority Data
Feb. 12, 1970  Germany......................P 20 06 242.4

[52] U.S. Cl...................................................................47/1
[51] Int. Cl.................................................................A01g 9/08
[58] Field of Search....................................................47/1, 37

[56] References Cited

UNITED STATES PATENTS 2,826,003  3/1958  Oki et al. .....................................47/1
2,869,283  1/1959  Krause..........................................47/1

FOREIGN PATENTS OR APPLICATIONS 1,104,252  4/1961  Germany

*Primary Examiner*—Robert E. Bagwill
*Attorney*—Arthur B. Colvin

[57] ABSTRACT

This invention relates to a machine for the potting of plants, for example, for the potting of flower seedlings and the like, the plants being inserted into a cavity which can be formed by means of a conically shaped planting ram, a rotatable carrier being positioned to carry a plurality of plant pots and intermittently move the pots into a container charged with earth and which is rotated to move the earth over the pots, to be dropped therein for filling thereof.

18 Claims, 4 Drawing Figures

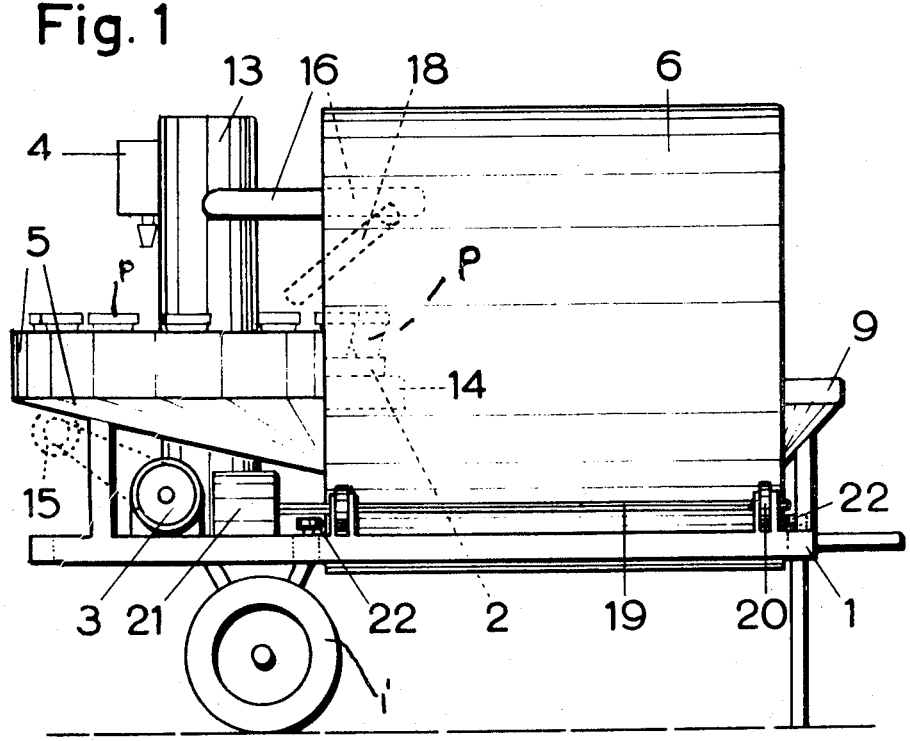
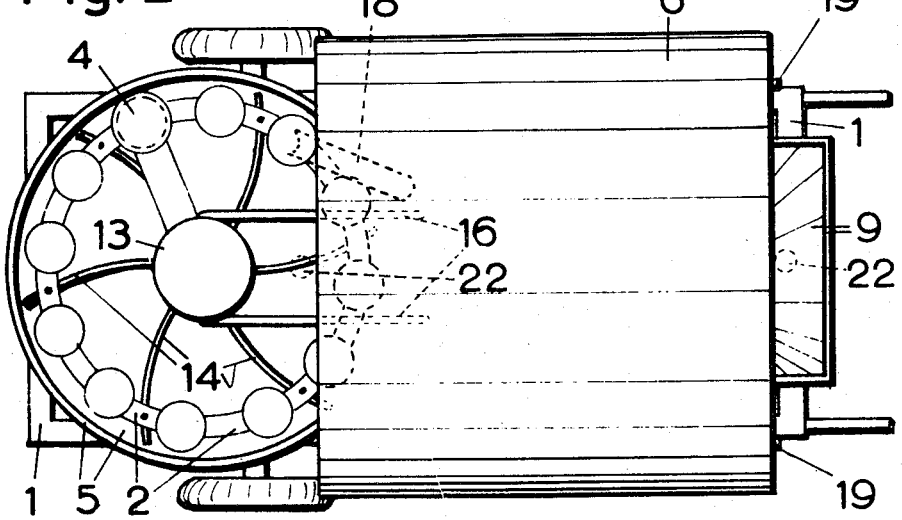

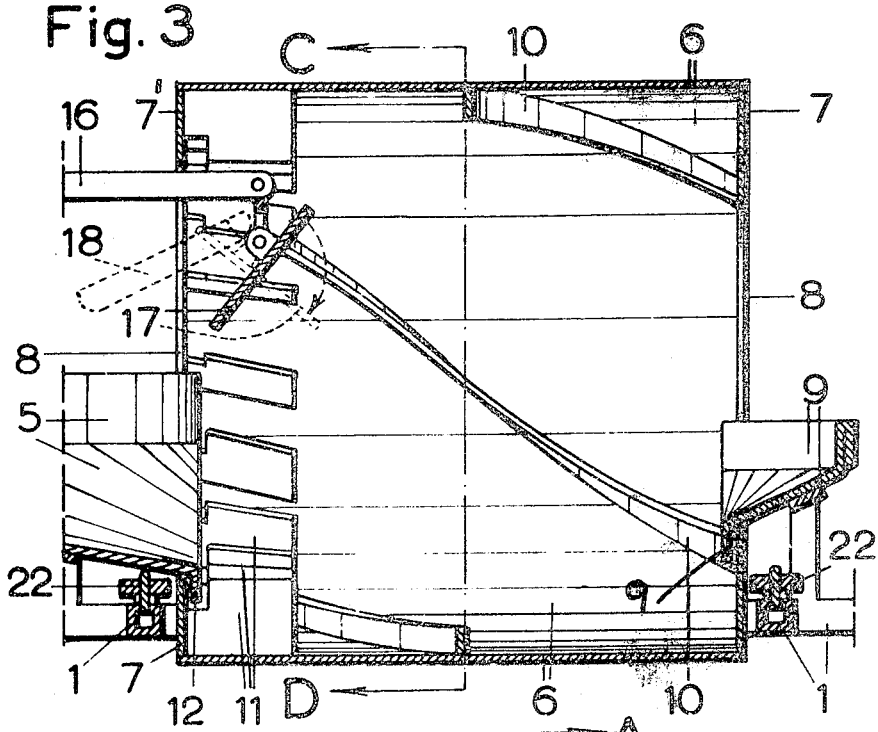
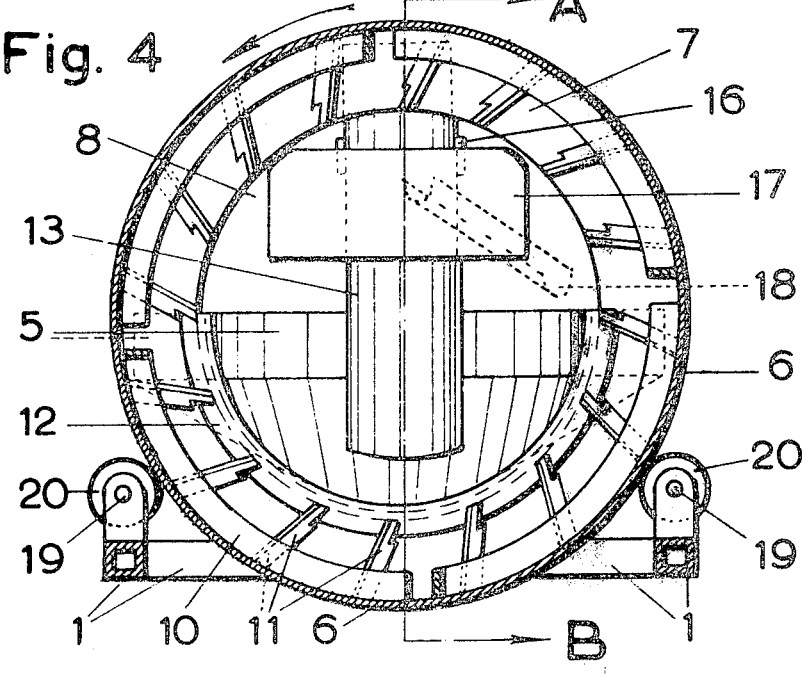

PLANT POTTING MACHINE

As conducive to an understanding of the invention it is noted that in order to be able to pot plants into pots filled with earth it is important that such pots can first be dependably and automatically filled with earth at relatively high speed.

Where earth filling machines are provided which utilize a plurality of motor driven conveyor screws to advance the earth from a container into the pots and such conveyor type of feeds require many conveyor screws of different sizes and direction of movement, the numerous motors, transmissions and the like required for such a system, renders the machine cumbersome, expensive and difficult to maintain.

It is among the object of the invention to provide a machine for filling pots at a relatively high speed, which machine is relatively simple in construction and is devoid of power driven conveyor screws and the like and is not likely to become deranged even with long use and which may readily be fabricated at relatively low cost.

According to the invention, a drum is provided, mounted for rotation on a substantially horizontal axis. The ends of the drum are partially closed defining opposed central openings. One of the openings affords means for charging the drum with earth. The other of said openings provides clearance for the periphery of a carrier which moves pots into and out of the openings so that the earth in the drum may be lifted by shovels rigid with the drum and dropped into the pots positioned in the drum.

In the accompanying drawings in which is shown one of various possible embodiments of the several features of the invention;

FIG. 1 shows a side view of an embodiment of the entire machine for potting plants, FIG. 2 shows a top plan view of the machine according to FIG. 1, FIG. 3 shows a vertical section through a part of FIG. 1 along the line A-B in FIG. 4, and FIG. 4 shows a vertical section along the line C-D of FIG. 3.

Referring now to the drawings, in the embodiment shown, a frame 1 is provided, having an undercarriage 1'. A carrier in the form of a rotatably mounted annulus or ring 2, which receives the plant pots P is positioned at one end of the frame. The drive 3 for intermittent advance of the ring 2 and the design of the motor-driven ram or plunger 4 for forming a cavity in the material in each plant pot are known in their form and method of operation. Under the ring 2 is arranged a trough 5 in which the excess earth falling beside the pots is collected.

The invention provides as a means for moving the earth, a drum 6 which is rotatably mounted on the frame 1. Both end faces of the drum 6 are closed partly by rings 7 in such a way that a circular opening 8 remains at both ends whose diameter is less than that of the drum 6. One of the rings 7' is narrower than the other and the width of the narrower ring 7 is so dimensioned that if the drum 6 is properly charged, the earth cannot fall out at the drum end. The drum in turn is so mounted on the frame 1 that at least one of the pots enters fully the circular opening 8 in ring 7', during intermittent rotation of carrier ring 2.

The drum 6 is charged through the rear circular opening 8 and the charged earth spreads during the rotation of the drum 6 on the inside on its inner wall. In order to facilitate the filling of the drum 6 with earth, a chute 9 is rigidly connected to the rear end of the frame 1, so that a wheelbarrow filled with earth can be so lifted that the earth drops easily through the chute 9 into the drum 6, the inner edge of the chute 9 on the drum side protruding into the adjacent circular opening 8 and terminating preferably in a substantially semicircular flange 9' which engages the ring 7 of the drum 6. The chute 9 is in any case so arranged that it is connected rigidly with the frame 1 and cannot be touched by the drum 6 at any point in the entire clearance of motion of the latter.

If the drum 6 is inclined toward the ring 2, the earth contained therein is moved during its rotation forward toward the ring 2. In order to increase this movement and to achieve the same effect with a horizontally mounted drum 6, helical webs 10 can be arranged with advantage on its inner wall. At the front end of the drum, approximately in the range traversed by the plant pots, the inner side of the drum is equipped with shovels 11 which are so dimensioned and arranged that they are filled with earth at the bottom during the rotation and emptied when they are above the plant tops.

The earth falling beside the pots naturally falls back into the drum 6 since the ring 2 is relatively narrow. The trough 5 arranged under the ring 2 is in addition so inclined that the earth still contained therein slides toward the drum 6. As in the chute 9, a substantially semicircular flange 12 is also provided in the trough 5, which reaches behind the ring 7 but never touches the drum during its rotation. Naturally the shovels 11 must be conformed in the range of this flange 12 so as not to engage the latter as it can be seen from FIGS. 3 and 4.

The invention is by no means limited to the represented combination with a ring shaped carrier 2, but can also be combined with other carrier forms. Thus, for example, a chainlike carrier can be used whose working path leads into the drum 6 or traverses the drum axially.

In the represented embodiment, the invention provides, for reasons of cleanliness and safety, that the switching elements for the feed of the ring and the movement of the ram or plunger 4 be surrounded by a vertical cylinder 13 arranged centrally to the ring 2. The ring 2 can be equipped with radial blades 14 (FIG. 2) which sweep the earth that has fallen into the trough 5 back into the drum 6. Another possibility for keeping the trough 6 clean, consists in an outside vibrator 15 or a similar shaking device arranged thereon, as it is indicated in FIG. 1 by the dotted line and which can be operated continuously or sporadically by the drive 3 of the ring feed.

For the rapid and complete fitting of the plant pots it is furthermore of advantage if an arm 16, consisting if necessary of several struts, is arranged indirectly on the frame 1, for example, on the cylinder 13. The end of this arm protrudes into the front circular opening 8 and carries a pivotal and lockable flap 17 which is arranged under the earth dropping from the shovels 11. The flap 17 can be adapted to any form and size of the ring and pots P. It can be turned and so adjusted that the optimum degree of filling is achieved in each case.

This arrangement also has another advantage. In the circular openings 8 can be detachable suspended a trough 18, indicated by broken lines in the drawings, which collects a small part of the earth dropped from the shovels 11 and which leads it into the pot arranged outside the drum (see FIGS. 1 and 2). This possibility is very advantageous for many repotting jobs in the garden, and by corresponding turning of the flap 17 (as indicated by broken lines in FIG. 3) the dropping earth can be returned to the rear into the drum to prevent premature filling of the pots.

For the support of the drum 6 two hubs can be used, suspended inside the drum but naturally outside the range of engagement of the ring 2 and of the chute 9, on radial spokes, which run on a shaft rigidly supported on the frame 1. The drawings, however, show a particularly advantageous type of drum support which consists in that shafts 19 are secured on each side of the frame 1, on which are mounted several supporting rollers 20. At least on one side of the frame, the supporting rollers 20 are mounted on a common shaft 19 and secured against rotation, while the shaft 19 is coupled in turn with a motor 21 secured on the frame 1. The supporting rollers 20 can be normally so dimensioned that an additional transmission is not necessary.

In this type of drum support and of the drum drive, the drum 6 can be attached loosely and needs no further fastening. It can also be easily removed for cleaning and repairs and then be attached again. The axial play of the rotating drum is limited by guide rollers 22 mounted on the frame 1.

The advantages of the invention consist in that the mechanical expenditure for moving the earth, the power consumption, and the weight of the machine are reduced to a fraction of the presently known values (for example, from 4.5 to 1.0 hp. and from about 600 to 300 kg.), while the output and particularly the safety are at the same time substantially increased. The machine equipped according to the invention is much less susceptible to trouble and offers considerable freedom of movement while working on the plant pots.

Having thus described my invention, what I claim as new and desire to secure by Letters Patent of the United States is:

1. A machine for the potting of plants inserted into a cavity formed in the earth filled into a planting pot comprising a carrier on which a plurality of pots may be positioned, means to effect movement of said carrier, a drum defining a container to be charged with earth, means mounting said drum for rotation thereof with the axis of said drum in substantially a horizontal plane, said drum having an axial opening at at least one end thereof, said carrier being mounted so as to have a portion thereof movable into and out of said opening, so that at least one planting pot may be moved fully inside said drum, and means in said drum to transport a portion of the earth therein to a position over such planting pot and to drop the transported earth by gravity into such planting pot.

2. The combination set forth in claim 1 in which the other end of said drum has an axial opening therein for charging of said drum.

3. The combination set forth in claim 2 in which a feed chute is associated with said opening and has an inlet positioned externally of said drum.

4. The combination set forth in claim 1 in which the other end of said drum has an axial opening therein for charging of said drum and both of said axial openings are defined by rings extending radially inward from the outer wall of said drum, the inner periphery of said rings defining said axial openings.

5. The combination set forth in claim 1 in which a plurality of shovels are positioned in said drum and spaced along the inner wall thereof adjacent said opening to transport the earth from the bottom of the drum to a position over the planting pots.

6. The combination set forth in claim 1 in which said carrier comprises a ring rotatably mounted on substantially a vertical axis, a portion of the periphery of said ring being positioned in said opening whereby planting pots positioned on said rings will be moved into and out of the drum.

7. The combination set forth in claim 1 in which a frame is provided, a plurality of supporting rollers are positioned on said frame on each side of said drum along the length thereof, said drum resting on said rollers, means being provided to rotate the rollers on at least one side of said drum to rotate the latter.

8. The combination set forth in claim 7 in which the rollers on one side of the drum are mounted on a common shaft and means are provided to rotate said shaft.

9. The combination set forth in claim 1 in which means are provided on said frame to limit the axial movement of said drum as it is rotated.

10. The combination set forth in claim 1 in which the axis of said drum is inclined toward said carrier.

11. The combination set forth in claim 1 in which a plurality of webs wound helically in longitudinal direction are mounted on the inner wall of said drum.

12. The combination set forth in claim 1 in which a frame is provided on which said drum is rotatably mounted, a trough is mounted on said frame beneath said carrier, said trough being inclined toward said drum and having an outlet in communication with said opening in said drum.

13. The combination set forth in claim 12 in which a vibrator is associated with said trough.

14. The combination set forth in claim 1 in which a planting plunger is provided positioned in alignment with said carrier over the latter, and means to actuate said plunger to move the latter into the earth in each pot to form a cavity therein.

15. The combination set forth in claim 1 in which a frame is provided on which said drum is rotatably mounted, a trough is mounted on said frame beneath said carrier, said trough having an outlet in communication with said opening in said drum, a planting plunger is positioned in alignment with said carrier over the latter, means to actuate said plunger to move the latter into the earth in each pot to form a cavity therein, a cylinder positioned centrally in said trough and rising therefrom, the drive means for said carrier and said plunger being positioned in said cylinder.

16. The combination set forth in claim 1 in which a frame is provided on which said drum is rotatably mounted, a trough is mounted on said frame beneath said carrier, said trough having an outlet in communication with said opening in said drum, said carrier having radially arranged blades movable in said trough to force the earth therein through said opening into said drum.

17. The combination set forth in claim 1 in which a frame is provided, said drum being rotatably mounted on said frame, a plurality of shovels are positioned in said drum and spaced along the inner wall thereof adjacent said opening to transport earth from the bottom of the drum to a position over the planting pots, a strut rigidly secured to said frame and having one end thereof extending through said opening into said drums, a flap pivotally mounted on the inner end of said arm, means to lock the flap in desired position in the path of movement of the earth dropping from a shovel at the top of the drum to guide such earth into an associated pot.

18. The combination set forth in claim 17 in which a trough is positioned in said opening and has an inlet in said drum and an outlet protruding from said drum and aligned with a pot on said carrier outside said drum.

* * * * *